(12) United States Patent
Ramesh

(10) Patent No.: US 11,797,560 B2
(45) Date of Patent: Oct. 24, 2023

(54) APPLICATION-BASED DATA TYPE SELECTION

(71) Applicant: Micron Technology, Inc., Boise, ID (US)

(72) Inventor: Vijay S. Ramesh, Boise, ID (US)

(73) Assignee: Micron Technology, Inc., Boise, ID (US)

(*) Notice: Subject to any disclaimer, the term of this patent is extended or adjusted under 35 U.S.C. 154(b) by 49 days.

(21) Appl. No.: 16/902,722

(22) Filed: Jun. 16, 2020

(65) Prior Publication Data

US 2021/0390112 A1 Dec. 16, 2021

(51) Int. Cl.
G06F 16/25 (2019.01)
G06F 11/34 (2006.01)

(52) U.S. Cl.
CPC ........ *G06F 16/258* (2019.01); *G06F 11/3409* (2013.01)

(58) Field of Classification Search
CPC ............................ G06F 16/258; G06F 11/3409
See application file for complete search history.

(56) References Cited

U.S. PATENT DOCUMENTS

| | | | |
|---|---|---|---|
| 4,758,972 A | 7/1988 | Frazier | |
| 7,865,541 B1 | 1/2011 | Langhammer | |
| 8,214,417 B2 | 7/2012 | Ahmed | |
| 8,880,801 B1* | 11/2014 | Robins | G06F 11/1092 711/170 |
| 2007/0283124 A1* | 12/2007 | Menczak | G06F 12/1045 711/E12.068 |
| 2013/0297908 A1* | 11/2013 | Krig | G06F 9/38 712/7 |
| 2015/0019746 A1* | 1/2015 | Shatzkamer | H04L 67/322 709/228 |
| 2015/0332764 A1* | 11/2015 | Cabout | G11C 13/0007 365/148 |
| 2016/0234092 A1* | 8/2016 | Avery | H04L 43/16 |
| 2017/0153926 A1* | 6/2017 | Callegari | G06F 9/5044 |
| 2021/0026691 A1* | 1/2021 | Hamann | G06F 9/50 |

OTHER PUBLICATIONS

Samadi et al. ("SAGE: Self-Tuning Approximation for Graphic Engines", MICRO'46, Dec. 7-11, 2013, Davis, CA, USA; 2013 Copyright is held by the owner/author(s); Publication right license to ACM) (Year: 2013).*

Gustafson ("Posit Arithmetic"; Oct. 10, 2017) (Year: 2017).*

(Continued)

*Primary Examiner* — Ken Hoang

(74) *Attorney, Agent, or Firm* — Brooks, Cameron & Huebsch, PLLC

(57) ABSTRACT

Methods, Systems, and Apparatuses related to application-based data type selection are described. A processing device perform operations to monitor performance characteristics associated with various applications executed by a host computing device to determine that a threshold performance level has been reached or exceeded. Operations to convert a data type utilized by the various applications from a first format that supports arithmetic operations to a first level of precision to a second format that supports arithmetic operations to a second level of precision can be performed based, at least in part, on the determination.

23 Claims, 5 Drawing Sheets

(56) References Cited

OTHER PUBLICATIONS

Tambe et al. ("Adaptive Float: A floating-point based data typed for resilient Deep Learning Integerence" Sep. 29, 2019) (Year: 2019).*
Gustafson, et al. "Beating Floating Point at its Own Game: Posit Arithmetic", Jan. 2017, retrieved from <http://www.johngustafson.net/pdfs/BeatingFloatingPoint.pdf>, 16 pages.

* cited by examiner

APPLICATION-BASED DATA TYPE SELECTION

TECHNICAL FIELD

The present disclosure relates generally to semiconductor memory and methods, and more particularly, to apparatuses, systems, and methods for application-based data type selection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
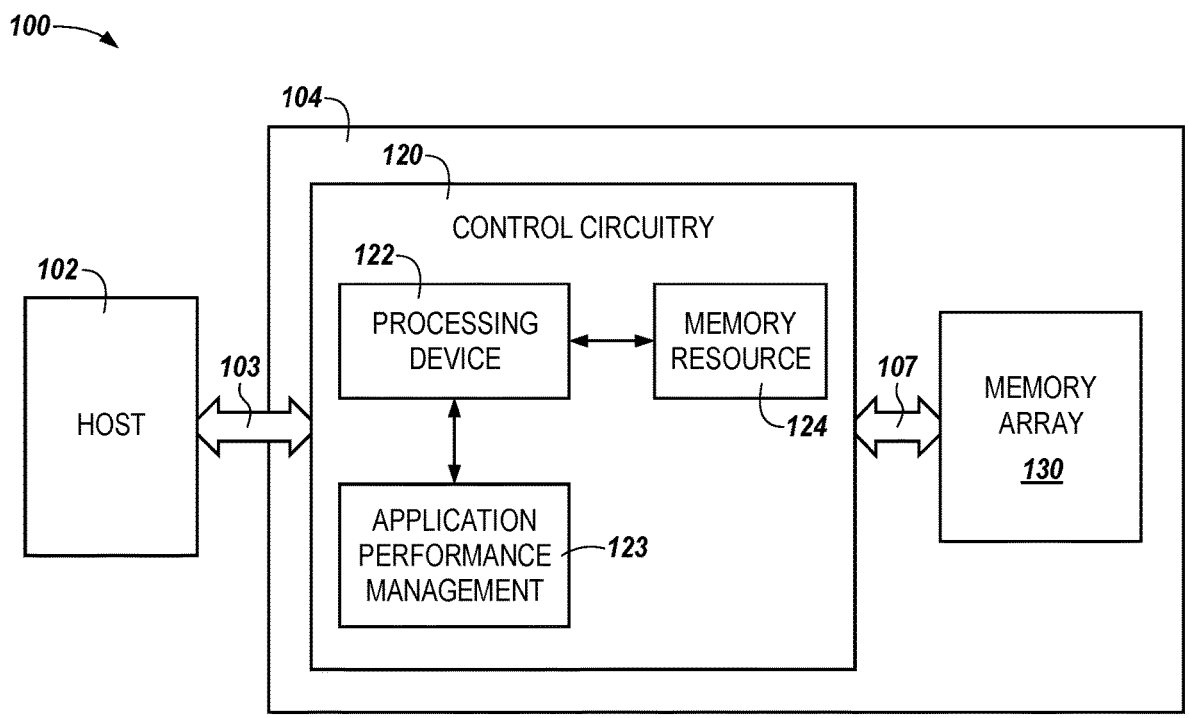
FIG. 1 is a functional block diagram in the form of an apparatus including a host and a memory device in accordance with a number of embodiments of the present disclosure.

Methods, Systems, and Apparatuses related to application-based data type selection are described. A processing device perform operations to monitor performance characteristics associated with various applications executed by a host computing device to determine that a threshold performance level has been reached or exceeded. Operations to convert a data type utilized by the various applications from a first format that supports arithmetic operations to a first level of precision to a second format that supports arithmetic operations to a second level of precision can be performed based, at least in part, on the determination.

As used herein, a "precision" refers to a quantity of bits in a bit string that are used for performing computations using the bit string. For example, if each bit in a 16-bit bit string is used in performing computations using the bit string, the bit string can be referred to as having a precision of 16 bits. However, if only 8 bits of a 16-bit bit string are used in performing computations using the bit string (e.g., if the leading 8 bits of the bit string are zeros), the bit string can be referred to as having a precision of 8-bits. As the precision of the bit string is increased, computations can be performed to a higher degree of accuracy. Conversely, as the precision of the bit string is decreased, computations can be performed with a lower degree of accuracy. For example, an 8-bit bit string can correspond to a data range consisting of two hundred and fifty-five (256) precision steps, while a 16-bit bit string can correspond to a data range consisting of sixty-five thousand five hundred and thirty-six (63,536) precision steps.

As used herein, a "dynamic range" or "dynamic range of data" refers to a ratio between the largest and smallest values available for a bit string having a particular precision associated therewith. For example, the largest numerical value that can be represented by a bit string having a particular precision associated therewith can determine the dynamic range of the data format of the bit string. For a universal number (e.g., a posit) format bit string, the dynamic range can be determined by the numerical value of the exponent bit sub-set (e.g., es described below in connection with FIGS. 3 and 4A-4B) of the bit string.

A dynamic range and/or the precision can have a variable range threshold associated therewith. For example, the dynamic range of data can correspond to an application that uses the data and/or various computations that use the data. This may be due to the fact that the dynamic range desired for one application may be different than a dynamic range for a different application, and/or because some computations may require different dynamic ranges of data. Accordingly, embodiments herein can allow for the dynamic range of data to be altered to suit the requirements of disparate applications and/or computations. In contrast to approaches that do not allow for the precision, accuracy, and/or dynamic range of the data to be manipulated to suit the requirements of different applications and/or computations, embodiments herein can improve resource usage and/or data precision by allowing for the dynamic range of the data to varied based on the application and/or computation for which the data will be used.

In addition, some embodiments can allow for data to be converted between various data types based on the computing application that is using the data. For example, a data type that may be better suited for use by a financial computing application may be different than a data type that is better suited for use by an astronomical computing application. Similarly, a data type that is better suited for use by an edge computing application may be different than a data type that is better suited for use by a financial or astronomical computing application. Accordingly, in some embodiments, conversion between data types may be performed based on the computing application that is using the data in order to improve the overall performance of the application and/or the computing system that is executing the application.

Computing systems can be used to perform a wide of range of operations using data such (e.g., bit strings), which can be processed by the computing system to facilitate operation of the computing system, as well as to perform computations using the data. Such operations can involve large sets of data and/or large bit strings and can therefore require vast computing resources (e.g., processing and/or memory resources) in their performance. Some examples of operations that can be performed using a computing system can include arithmetic operations, logical operations, bitwise operations, vector operations, and/or dot product operations, as well as recursive operations, such as accumulate operations, multiply-accumulate (MAC) operations, fused-multiply add (FMA) operations, and/or fused multiply-accumulate (FMAC) operations, among others.

These and other operations can be performed during the execution of computing applications as part of providing a functionality associated with execution of the computing applications. As used herein, a "computing application" generally refers to a program or group of programs that, when executed by a computing system, perform one or more functions or activities. Non-limiting examples of computing applications can include astronomical applications (e.g., computing applications designed to perform computations involving astronomical imaging, global positioning systems, and/or communication satellites, among others), atomic applications (e.g., computing applications that are based on quantum computing in which scalable computing systems leverage properties of individual atoms to perform various computations), and/or financial applications (e.g., computing applications designed to perform computations involving financial technology, or "FinTech," in which financial operations, processes, and/or other financial services are performed using specialized computing applications).

Additional non-limiting examples of computing applications can include edge computing applications (e.g., applications utilized by distributed computing systems that bring computation and data storage physically closer to a location in which a user of the data is located), such as autonomous vehicle applications, data-center applications, personalized medicine applications, cyber security applications, augmented reality applications, virtual reality applications, internet-of-things applications, smart city embedded applications, and/or portable embedded computer applications, among others.

Because computing systems may perform a wide range of operations that can include various calculations in the course of executing computing applications, bit strings having differing degrees of accuracy, precision, and/or dynamic ranges may be desired for different operations and/or computing applications. However, computing systems have a finite amount of memory in which to store operands on which calculations are to be performed. In order to facilitate performance of operation on operands stored by a computing system within the constraints imposed by finite memory resources, operands can be stored in particular formats and/or as particular data types. One such format is referred to as the "floating-point" format, or "float," for simplicity (e.g., the IEEE 754 floating-point format).

Under the floating-point standard, bit strings (e.g., strings of bits that can represent a number), such as binary number strings, are represented in terms of three sets of integers or sets of bits—a set of bits referred to as a "base," a set of bits referred to as an "exponent," and a set of bits referred to as a "mantissa" (or significand). The sets of integers or bits that define the format in which a binary number string is stored may be referred to herein as an "numeric format," or "format," for simplicity. For example, the three sets of integers of bits described above (e.g., the base, exponent, and mantissa) that define a floating-point bit string may be referred to as a format (e.g., a first format). As described in more detail below, a posit bit string may include four sets of integers or sets of bits (e.g., a sign, a regime, an exponent, and a mantissa), which may also be referred to as a "numeric format," or "format," (e.g., a second format). In addition, under the floating-point standard, two infinities (e.g., +∞ and −∞) and/or two kinds of "NaN" (not-a-number): a quiet NaN and a signaling NaN, may be included in a bit string.

The floating-point standard has been used in computing systems for a number of years and defines arithmetic formats, interchange formats, rounding rules, operations, and exception handling for computation carried out by many computing systems. Arithmetic formats can include binary and/or decimal floating-point data, which can include finite numbers, infinities, and/or special NaN values. Interchange formats can include encodings (e.g., bit strings) that may be used to exchange floating-point data. Rounding rules can include a set of properties that may be satisfied when rounding numbers during arithmetic operations and/or conversion operations. Floating-point operations can include arithmetic operations and/or other computational operations such as trigonometric functions. Exception handling can include indications of exceptional conditions, such as division by zero, overflows, etc.

An alternative format to floating-point is referred to as a "universal number" (unum) format. There are several forms of unum formats—Type I unums, Type II unums, and Type III unums, which can be referred to as "posits" and/or "valids." Type I unums are a superset of the IEEE 754 standard floating-point format that use a "ubit" at the end of the mantissa to indicate whether a real number is an exact float, or if it lies in the interval between adjacent floats. The sign, exponent, and mantissa bits in a Type I unum take their definition from the IEEE 754 floating-point format, however, the length of the exponent and mantissa fields of Type I unums can vary dramatically, from a single bit to a maximum user-definable length. By taking the sign, exponent, and mantissa bits from the IEEE 754 standard floating-point format, Type I unums can behave similar to floating-point numbers, however, the variable bit length exhibited in the exponent and fraction bits of the Type I unum can require additional management in comparison to floats.

Type II unums are generally incompatible with floats, however, Type II unums can permit a clean, mathematical design based on projected real numbers. A Type II unum can include n bits and can be described in terms of a "u-lattice" in which quadrants of a circular projection are populated with an ordered set of $2^{n-3}-1$ real numbers. The values of the Type II unum can be reflected about an axis bisecting the circular projection such that positive values lie in an upper right quadrant of the circular projection, while their negative counterparts lie in an upper left quadrant of the circular projection. The lower half of the circular projection representing a Type II unum can include reciprocals of the values that lie in the upper half of the circular projection. Type II unums generally rely on a look-up table for most operations. As a result, the size of the look-up table can limit the efficacy of Type II unums in some circumstances. However, Type II unums can provide improved computational functionality in comparison with floats under some conditions.

The Type III unum format is referred to herein as a "posit format" or, for simplicity, a "posit." In contrast to floating-point bit strings, posits can, under certain conditions, allow for higher precision (e.g., a broader dynamic range, higher resolution, and/or higher accuracy) than floating-point numbers with the same bit width. This can allow for operations performed by a computing system to be performed at a higher rate (e.g., faster) when using posits than with floating-point numbers, which, in turn, can improve the performance of the computing system by, for example, reducing a number of clock cycles used in performing operations thereby reducing processing time and/or power consumed in performing such operations. In addition, the use of posits in computing systems can allow for higher accuracy and/or precision in computations than floating-point numbers, which can further improve the functioning of a computing system in comparison to some approaches (e.g., approaches which rely upon floating-point format bit strings).

Posits can be highly variable in precision and accuracy based on the total quantity of bits and/or the quantity of sets of integers or sets of bits included in the posit. In addition, posits can generate a wide dynamic range. The accuracy, precision, and/or the dynamic range of a posit can be greater than that of a float, or other numerical formats, under certain conditions, as described in more detail herein. The variable accuracy, precision, and/or dynamic range of a posit can be manipulated, for example, based on an application in which a posit will be used. In addition, posits can reduce or eliminate the overflow, underflow, NaN, and/or other corner cases that are associated with floats and other numerical formats. Further, the use of posits can allow for a numerical value (e.g., a number) to be represented using fewer bits in comparison to floats or other numerical formats.

These features can, in some embodiments, allow for posits to be highly reconfigurable, which can provide improved application performance in comparison to approaches that rely on floats or other numerical formats. In addition, these features of posits can provide improved performance in machine learning applications in comparison to floats or other numerical formats. For example, posits can be used in machine learning applications, in which computational performance is paramount, to train a network (e.g., a neural network) with a same or greater accuracy and/or precision than floats or other numerical formats using fewer bits than floats or other numerical formats. In addition, inference operations in machine learning contexts can be achieved using posits with fewer bits (e.g., a smaller bit width) than floats or other numerical formats. By using fewer bits to achieve a same or enhanced outcome in comparison to floats or other numerical formats, the use of posits can therefore reduce an amount of time in performing operations and/or reduce the amount of memory space required in applications, which can improve the overall function of a computing system in which posits are employed.

Embodiments herein are directed to hardware circuitry (e.g., control circuitry) configured to perform various operations on bit strings to improve the overall functioning of a computing device. For example, embodiments herein are directed to hardware circuitry that is configured to perform operations to monitor various performance characteristics of applications during execution (e.g., at runtime of the applications) to determine if application performance can be altered if a different data type than a data type that is currently being used by that application is employed. As used herein, a "data type" generally refers to a format in which data, such as bit strings, are provided to the application. Non-limiting examples of data types can include floating-point bit strings, universal number bit strings, posit bit strings, and/or fixed-point binary bit strings, among others. The term "data type" may be used interchangeably herein with the term "data format." In some embodiments, the hardware circuitry can alter the data type being used by the application in response to a determination that the application performance can be improved if a different data type is provided to the application. In order to achieve this, the hardware circuitry can be configured to perform conversion operations on bit strings used by the application to convert the data type from one data type to another data type and cause the converted bit string to be used by the application.

Application performance can be measured in terms of various performance characteristics. As used herein, "performance characteristics" can include an application response time, a quantity of application errors, a collected user satisfaction metric, types of application dependencies, transaction traces associated with the applications, application errors generated due to iteration, power consumption associated with the application, precision or accuracy of data generated when the application is executed using data in the first format or data in the second format, a latency parameter associated with the application, and/or a reliability parameter associated with the application, among others.

In contrast to approaches in which applications are executed using a static data type, embodiments described herein can allow for application performance to be enhanced by dynamically adjusting data types used by applications to maximize application performance. That is, in contrast to approaches that operate using a single data type (e.g., a floating-point data type) regardless of application performance, embodiments herein can allow for the data type to be converted (e.g., to a universal number or posit data type) in response to a determination that application performance can be improved using a universal number or posit data type.

In addition, in approaches that do not allow for conversion between data types used by an application based on the performance characteristics of the application, performance characteristics of the applications may not be monitored or analyzed. In contrast, embodiments herein can allow for such performance characteristics to be monitored during execution of applications, which can provide a more holistic view of application performance, especially across disparate applications that may be executed in a computing system to perform various tasks and/or functions.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" and "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "bit strings," "data," and "data values" are used interchangeably herein and can have the same meaning, as appropriate to the context. In addition, the terms "set of bits," "bit sub-set," and "portion" (in the context of a portion of bits of a bit string) are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 120 may reference element "20" in FIG. 1, and a similar element may be referenced as 220 in FIG. 2. A group or plurality of similar elements or components may generally be referred to herein with a single element number. For example, a plurality of reference elements 431-1, 431-2, . . . , 431-N may be referred to generally as 431. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a host 102 and a memory device 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory device 104 can include a one or more memory modules (e.g., single in-line memory modules, dual in-line memory modules, etc.). The memory device 104 can include volatile memory and/or non-volatile memory. In a number of embodiments, memory device 104 can include a multi-chip device. A multi-chip device can include a number of different memory types and/or memory modules. For example, a memory system can include non-volatile or volatile memory on any type of a module.

As shown in FIG. 1, the apparatus 100 can include control circuitry 120, which can include a processing device 122, an application performance management (APM) component 123, and a memory resource 124 and a memory array 130. Each of the components (e.g., the host 102, the control circuitry 120, the processing device 122, the memory resource 124, and/or the memory array 130) can be separately referred to herein as an "apparatus."

The memory device 104 can provide main memory for the computing system 100 or could be used as additional memory or storage throughout the computing system 100. The memory device 104 can include one or more memory arrays 130 (e.g., arrays of memory cells), which can include volatile and/or non-volatile memory cells. The memory array 130 can be a flash array with a NAND architecture, for example. Embodiments are not limited to a particular type of memory device. For instance, the memory device 104 can include RAM, ROM, DRAM, SDRAM, PCRAM, RRAM, and flash memory, among others.

In embodiments in which the memory device 104 includes non-volatile memory, the memory device 104 can include flash memory devices such as NAND or NOR flash memory devices. Embodiments are not so limited, however, and the memory device 104 can include other non-volatile memory devices such as non-volatile random-access memory devices (e.g., NVRAM, ReRAM, FeRAM, MRAM, PCM), "emerging" memory devices such as variable resistance (e.g., 3-D Crosspoint (3D XP) memory devices), memory devices that include an array of self-selecting memory (SSM) cells, etc., or combinations thereof. Variable resistance memory devices can perform bit storage based on a change of bulk resistance, in conjunction with a stackable cross-gridded data access array. Additionally, in contrast to many flash-based memories, variable resistance non-volatile memory can perform a write in-place operation, where a non-volatile memory cell can be programmed without the non-volatile memory cell being previously erased. In contrast to flash-based memories and variable resistance memories, self-selecting memory cells can include memory cells that have a single chalcogenide material that serves as both the switch and storage element for the memory cell.

As illustrated in FIG. 1, a host 102 can be coupled to the memory device 104. In a number of embodiments, the memory device 104 can be coupled to the host 102 via one or more channels (e.g., channel 103). In FIG. 1, the memory device 104 is coupled to the host 102 via channel 103 and control circuitry 120 of the memory device 104 is coupled to the memory array 130 via a channel 107. The host 102 can be a host system such as a personal laptop computer, a desktop computer, a digital camera, a smart phone, a memory card reader, and/or an internet-of-things (IoT) enabled device, among various other types of hosts.

The host 102 can include a system motherboard and/or backplane and can include a memory access device, e.g., a processor (or processing device). One of ordinary skill in the art will appreciate that "a processor" can intend one or more processors, such as a parallel processing system, a number of coprocessors, etc. The system 100 can include separate integrated circuits or both the host 102, the memory device 104, and the memory array 130 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture The memory device 104, which is shown in more detail in FIG. 2, herein, can include control circuitry 120, which can include a processing device 122 and a memory resource 124. That is, in some embodiments, the control circuitry 120 (as well as the processing device 122 and the memory resource 124) can be resident on the memory device 104. As used herein, the term "resident on" refers to something that is physically located on a particular component. For example, the control circuitry 120 being "resident on" the memory device 104 refers to a condition in which the hardware that comprises the control circuitry 120 is physically located on the memory device 104. The term "resident on" may be used interchangeably with other terms such as "deployed on" or "located on," herein The processing device 122 can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the processing device 122 can comprise one or more processors (e.g., processing device(s), processing unit(s), etc.) The processing device 122 can monitor application executed by the host 102 to determine performance characteristics of the applications at runtime. In addition, the processing device can perform operations (e.g., operations to convert bit strings between various data types, recursive operations or other computation operations described below, etc.) using bit strings stored by the memory resource 124, the memory array 130, and/or provided by the host 102 as part of execution of a computing application.

The processing device 122 can be configured to monitor performance characteristics of the applications such as an application response time, a quantity of application errors, a collected user satisfaction metric, types of application dependencies, transaction traces associated with the applications, application errors generated due to iteration, power consumption associated with the application, precision or accuracy of data generated when the application is executed using data in the first format or data in the second format, a latency parameter associated with the application, and/or a reliability parameter associated with the application, among others during runtime of the application.

The application response time can be an amount of time that elapses for the application to return results of a submitted request to an end user. Application response time can be affected by bandwidth, a volume of submitted user requests, and/or a think time. The application response time can also be affected by the data type being used by the application. For example, because different data types can include different quantities of bits (e.g., can be different sizes), can have different accuracy characteristics associated therewith, etc. the application response time can depend on the data type used by the application during runtime of the application.

The quantity of application errors can be a quantity of errors experienced by an application during runtime. Application errors can be generated due to application conflicts or other bugs that can pose a threat to the stability of the application. In some instances, a quantity of application errors can be reduced at runtime of an application due by executing the application using a different data type that the application is using when the errors occur.

The collected user satisfaction metric can be generated using feedback provided from users of the application. For example, application users can be asked to input a satisfaction score associated with use of the application. These satisfaction scores can be aggregated and assigned to different applications. In some embodiments, the user satisfaction metric can be associated with execution of a particular application using different data types. If the user satisfaction metric for the particular application corresponds to higher user satisfaction scores when a particular data type is used with the application, the processing device 122 can convert the data used by the application to the data type that exhibits the highest user satisfaction scores and executed using that data type.

The types of application dependencies can correspond to libraries and portions of code that are used in the execution of a particular computing application. If one or more application dependencies are not functioning properly, execution of the application can be adversely impacted. In addition, the data type that an application is using can affect the dependencies. Accordingly, some data types may mitigate issues incurred from application dependencies.

The transaction traces associated with the applications can include detailed snapshots of a single transaction in an application. In some embodiments, transaction traces can be monitored and captured by the application performance management (APM) component 123. Transaction traces can provide detailed information about the behavior of applications and can accordingly be used to determine whether an application can benefit from using data that is formatted in a different data type.

Application errors generated due to iteration can correspond to a tendency for an application to incur more errors over time. For example, for some applications, a quantity of errors incurred in execution of the application can increase the longer the application is executed. In some embodiments, such errors can be mitigated by selecting a data type for use by the application that corresponds to a reduced tendency to incur errors over time.

Power consumption associated with the application can correspond to an amount of power consumed in terms of processing resources used by the application in execution and/or in terms of battery draw in the case of a mobile computing device (e.g., a laptop, smartphone, etc.). In some embodiments, an amount of power consumed in execution of an application can be altered based on the data type used by the application. For example, some data types may correspond to decreased power consumption by the application while other data types may correspond to increased power consumption by the application.

The precision or accuracy of data generated when the application is executed using data in the first format or data in the second format can correspond to behavior of the data types when executed by a particular application such that precision, accuracy, and/or dynamic range of an output of the application can fluctuate based on the data type the application is using at runtime. For example, The latency parameter associated with the application can correspond to a quantity of time that transpires between an action and a response for the application. For example, the quantity of time between a request for the application to perform a task or function and the application outputting the result of the requested task or function. In some embodiments, the application latency can be affected by the data type the application is using.

The reliability parameter associated with the application can correspond to a probability that the application operates without failure within a specified environment for a set duration of time. In some embodiments, the reliability of the application can correspond to the reliability parameter, which can be affected by the data type the application is using.

In some embodiments, the processing device 122 can monitor the performance characteristics of the applications and determine if the application performance can be improved by providing bit strings having a different data type to the application. For example, if the application is an astronomical application, improved application performance may be realized if the data used by the astronomical application has a universal number or posit format. In addition, an astronomical application may benefit from increased accuracy, dynamic range, and/or precision when executed using data that is formatted in the universal number or posit format in comparison to a floating-point or fixed-point binary format. Accordingly, in some embodiments, the processing device 122 and/or the APM component 123 can monitor performance characteristics of the application and determine if it would be beneficial to application performance to convert the data from a floating-point or fixed-point binary format to a universal number or posit format or vice versa.

In another example, if the application is a financial (e.g., a financial technology) application, the processing device 122 and/or the APM component 123 may determine that a financial loss could occur if the application is executed with a particular data type. For example, one or more bit sub-sets of particular data types may be restricted in comparison to others, which can lead to lost precision, accuracy, and/or dynamic range during the execution of the application. This can, in the case of a financial application, lead to financial loss due to rounding or other errors. Accordingly, in some embodiments, the processing device 122 and/or the APM component 123 can monitor the application at runtime to determine if the use of a different data type could improve the performance of the financial application.

In some embodiments, the processing device 122 can be configured to perform (or cause performance of) recursive arithmetic operations such as addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or logarithm operations, and/or recursive logical operations such as AND, OR, XOR, NOT, etc., as well as trigonometric operations such as sine, cosine, tangent, etc. as part of execution of a computing application. As will be appreciated, the foregoing list of operations is not intended to be exhaustive, nor is the foregoing list of operations intended to be limiting, and the processing device 122 may be configured to perform (or cause performance of) other arithmetic and/or logical operations as part of execution of the computing application.

As shown in FIG. 1, the processing device 122 can be coupled to an application performance management (APM) component 123. The APM component 123 can include circuitry and/or logic configured to monitor performance (e.g., performance characteristics) of applications executed by the host 102 and/or the processing device 122. In addition to monitoring the performance characteristics described above, the APM component 123 can, individually or in concert with the processing device 122, process the monitored information to determine if the performance of an application (e.g., if one or more performance characteristics of an application) can be improved if the application is executed using data that has a particular data type associated therewith. If the APM component 123 determines that the application performance can be improved if the application is executed using data with the particular data type associated therewith, the APM component 123 can send one or more commands to the processing device 122 to cause the processing device 122 to convert the data being used by the application to a desired data type.

The control circuitry 120 can further include a memory resource 124, which can be communicatively coupled to the processing device 122. The memory resource 124 can include volatile memory resource, non-volatile memory resources, or a combination of volatile and non-volatile memory resources. In some embodiments, the memory resource can be a random-access memory (RAM) such as static random-access memory (SRAM). Embodiments are not so limited, however, and the memory resource can be a cache, one or more registers, NVRAM, ReRAM, FeRAM, MRAM, PCM), "emerging" memory devices such as 3-D Crosspoint (3D XP) memory devices, etc., or combinations thereof.

In a non-limiting example, the memory resource 124 can serve as a cache for the processing device 122. The processing device 122 can monitor performance characteristics associated with execution of applications executed by a host 102 coupled to the processing device 122. The processing device 122 can determine that a performance characteristic associated with at least one application that uses data formatted according to a first format that supports arithmetic operations to a first level of precision has reached a threshold performance level. As used herein, a "threshold performance level" generally refers to a condition in which the performance of an application cannot be increased so long as the application is using bit strings that have a particular data type. For example, if an application is using bit strings formatted according to a fixed-point binary format, there may be a cap on how the application performs so long as the application is using bit strings formatted according to the fixed-point binary format. However, the performance of the application may be able to be increased if the bit strings are formatted according to a different format, such as a floating-point format, a universal number format, a posit format, etc.

As described above, the performance of the application can be measured in terms of various performance characteristics, such as can include an application response time, a quantity of application errors, a collected user satisfaction metric, types of application dependencies, transaction traces associated with the applications, application errors generated due to iteration, power consumption associated with the application, precision or accuracy of data generated when the application is executed using data in the first format or data in the second format, a latency parameter associated with the application, and/or a reliability parameter associated with the application, among others.

The processing device 122 can perform an operation to convert the data (e.g., bit strings) utilized by the at least one application from the first format to a second format that supports arithmetic operations to a second level of precision based, at least in part, on the determination. For example, if the processing device 122 determines that the performance of the application can be improved if the application uses data formatted according to a format that is different than data format the application is using, the processing device 122 can convert the data used by the application from one format to another (e.g., from a fixed-point binary format to a universal number or posit format, or vice versa). The processing device 122 can cause the at least one application to be executed using the data formatted according to the second format.

As described above, the application can be an application that is configured to perform astronomical computations, atomic computations, financial computations, edge computing applications, such as autonomous vehicle applications, data-center applications, personalized medicine applications, cyber security applications, augmented reality applications, virtual reality applications, internet-of-things applications, smart city embedded applications, and/or portable embedded computer applications, among others.

In some embodiments, the processing device 122 can be configured to perform the operation to convert the data utilized by the at least one application from the first format to the second format by altering a quantity of bits associated with at least one bit sub-set contained within the data. For example, the processing device 122 can be configured to add or remove bits from one or more bits sub-sets contained within the data. In a non-limiting example in which the first format is a floating-point format and the second format is a posit format, the processing device can be configured to add or remove bits to the bit sub-sets of the floating-point bit strings to convert the floating-point bit strings to posit bit strings.

The processing device 122 can be configured to determine that the performance characteristic associated with the at least one application has reached a second threshold performance level and perform an operation to convert the data utilized by the at least one application from the second format to a third format based, at least in part, on the determination. For example, the processing resource 122 can determine that the application has reached a second threshold performance level when the application is executed using data formatted in the second format.

As a non-limiting example, the application can reach the first threshold performance level when executed using data formatted in a fixed-point format and the processing device 122 can convert the data to a floating-point format. The application can then be executed using data formatted in the floating-point format. If the processing device 122 determines that the application has reached the second threshold performance level when executed using data formatted in the floating-point format, the processing device 122 can convert the data to a universal number or posit format and can cause the application to be executed using data formatted in the universal number or posit format. As will be appreciated, the above-enumerated formats and order of conversions is merely illustrative and other formats and/or other orders of conversions are contemplated within the scope of the disclosure.

In some embodiments, the processing device 122 can be configured to determine an application type for the at least one application and alter a precision of the data in the second format based, at least in part, on the determined application type of the at least one application. For example, the processing device 122 can be configured to determine if the application is The processing device 122 can, in some embodiments, be configured to configured to access data generated by the application performance management component 123 to monitor the performance characteristics. In addition to the non-limiting performance characteristics described above, other examples of performance characteristics can include identification of web requests (e.g., slowest or fastest web requests, most used or least used web requests, etc.), key web requests, web transactions, structured query language (SQL) queries (e.g., slowest or fastest SQL queries, most used or least used SQL queries, etc.), and/or performance of specific SQL queries, among others. In some embodiments, the performance characteristics monitored by the APM component 123 can be used by the processing device 122 in the manner described above.

In another non-limiting example, the processing device 122 can be coupled to the host 102 and an application performance management component 123. The processing device 122 can be configured to receive performance characteristics determined by the APM 123 and corresponding to execution of applications executed by the host 102 and analyze the performance characteristics to determine that a change in at least one performance characteristic has occurred with respect to at least one application. As described above, the performance characteristics can include information corresponding to a health of the applications executed by the host 102.

The processing device 122 can be further configured to perform an operation to convert data utilized by the at least one application from a first format that supports arithmetic operations to a first level of precision to a second format that supports arithmetic operations to a second level of precision based, at least in part, on the determination and supports arithmetic operations to a second level of precision based, at least in part, on the determination.

In some embodiments, the processing device 122 can be configured to determine that the performance characteristic associated with the at least one application has reached a second threshold performance level, perform an operation to convert the data utilized by the at least one application from the second format to the first format based, at least in part, on the determination, and/or execute the at least one application using the data formatted according to the first format.

The processing device 122 can be configured to determine that the at least one application is a financial application and alter a quantity of bits associated with a mantissa bit sub-set of the data used by the at least one application based on the determination.

In some embodiments, the processing device 122 can be configured to determine that the at least one application is an astronomical application and alter a quantity of bits associated with at least one bit sub-set of the data used by the at least one application based on the determination to increase a dynamic range available to the at least one application.

In some embodiments, the processing device 122 can be configured to determine that the at least one application is an atomic application and alter a quantity of bits associated with at least one bit sub-set of the data used by the at least one application based on the determination to increase a dynamic range available to the at least one application.

In yet another non-limiting example, the processing device 122 can be coupled to the memory resource 124. In this illustrative example the memory resource 124 can be configured to be a cache for the processing device 122. The processing device 122 and/or the APM component 123 can be configured to monitor characteristics of a plurality of applications executed by the processing device and determine an application type for a particular application based on the monitored characteristics for the particular application. The performance characteristics can include monitored application response times, application error information, collected user satisfaction metrics, application dependencies among the plurality of applications, and/or a transaction trace associated with the particular application, among others.

The application type can correspond to a task or function that the application is designed to perform. As described above, some examples of an application type can include astronomical applications, atomic applications, financial applications, edge computing applications, autonomous vehicle applications, data-center applications, personalized medicine applications, cyber security applications, augmented reality applications, virtual reality applications, internet-of-things applications, smart city embedded applications, and/or portable embedded computer applications, among others.

The processing device 122 can be configured to determine a type of data utilized by the particular application, wherein the type of data comprises data formatted in a first format that supports arithmetic operations to a first level of precision or data formatted in a second format that supports arithmetic operations to a second level of precision and determine that one of the first format or the second format corresponds to performance characteristics of the particular application being greater than a threshold application performance characteristic.

In some embodiments, the processing device 122 can be configured to perform an operation to convert the data from the first format or the second format to the other of the first format or the second format based on the determination that the performance characteristics of the particular application are greater than the threshold application performance characteristic using the other of the first format or the second format and execute the application using data formatted in the converted format.

In some embodiments, the processing device 122 can determine that the application type for the application corresponds to a financial application, determine that the first format comprises a universal number format and the second format comprises an IEEE 754 format or a fixed-point binary format, or vice versa, and perform the operation to convert the data from the first format to the second format.

In some embodiments, the processing device 122 can determine that the application type for the application corresponds to an astronomical computation application, determine that the first format comprises an IEEE 754 or fixed-point binary format and the second format comprises a universal number format or a posit format, or vice versa, and perform the operation to convert the data from the first format to the second format.

In some embodiments, the processing device 122 can determine that the application type for the application corresponds to an atomic computation application, determine that the first format comprises an IEEE 754 or fixed-point binary format and the second format comprises a universal number format or a posit format, or vice versa, and perform the operation to convert the data from the first format to the second format.

The processing device 122 can, in some embodiments, be configured to cause execution of the application once the application has been converted to a desired format (e.g., converted from the first format to the second format).

The embodiment of FIG. 1 can include additional circuitry that is not illustrated so as not to obscure embodiments of the present disclosure. For example, the memory device 104 can include address circuitry to latch address signals provided over I/O connections through I/O circuitry. Address signals can be received and decoded by a row decoder and a column decoder to access the memory device 104 and/or the memory array 130. It will be appreciated by those skilled in the art that the number of address input connections can depend on the density and architecture of the memory device 104 and/or the memory array 130.

Figure 2A:
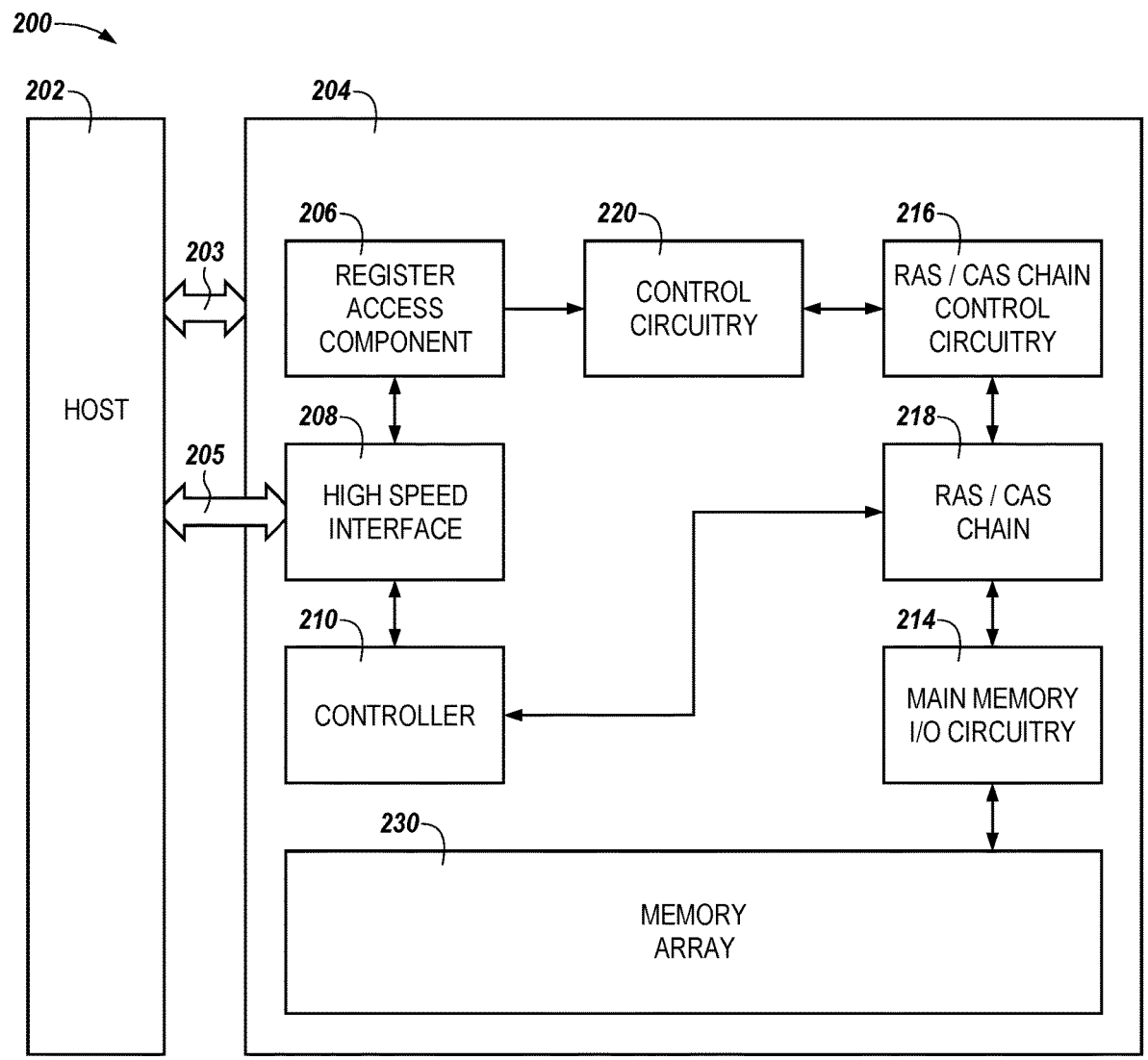
FIG. 2A is a functional block diagram in the form of a computing system including an apparatus including a host and a memory device in accordance with a number of embodiments of the present disclosure.

FIG. 2A is a functional block diagram in the form of a computing system including an apparatus 200 including a host 202 and a memory device 204 in accordance with a number of embodiments of the present disclosure. The memory device 204 can include control circuitry 220, which can be analogous to the control circuitry 120 illustrated in FIG. 1. Similarly, the host 202 can be analogous to the host 102 illustrated in FIG. 1, and the memory device 204 can be analogous to the memory device 104 illustrated in FIG. 1. Each of the components (e.g., the host 202, the bit string conversion circuitry 220, the logic circuitry 222, the memory resource 224, and/or the memory array 230, etc.) can be separately referred to herein as an "apparatus."

The host 202 can be communicatively coupled to the memory device 204 via one or more channels 203, 205. The channels 203, 205 can be interfaces or other physical connections that allow for data and/or commands to be transferred between the host 202 and the memory device 205. For example, commands to cause initiation of an operation (e.g., an operation to initiate a recursive operation using one or more bit strings, an operation to modify a result of an iteration of the recursive operation, an operation to store the modified result of an iteration of the recursive operation and a factor by which the result of the iteration of the recursive operation was modified in the periphery sense amplifiers 211, the quire register 231, and/or the factor register 242) to be performed using the control circuitry 220 can be transferred from the host via the channels 203, 205. It is noted that, in some embodiments, the control circuitry 220 can perform the operations in response to an initiation command transferred from the host 202 via one or more of the channels 203, 205 in the absence of an intervening command from the host 202. That is, once the control circuitry 220 has received the command to initiate performance of an operation from the host 202, the operations can be performed by the control circuitry 220 in the absence of additional commands from the host 202.

As shown in FIG. 2A, the memory device 204 can include a register access component 206, a high speed interface (HSI) 208, a controller 210, main memory input/output (I/O) circuitry 214, row address strobe (RAS)/column address strobe (CAS) chain control circuitry 216, a RAS/CAS chain component 218, control circuitry 220, and a memory array 230.

The register access component 206 can facilitate transferring and fetching of data from the host 202 to the memory device 204 and from the memory device 204 to the host 202. For example, the register access component 206 can store addresses (or facilitate lookup of addresses), such as memory addresses, that correspond to data that is to be transferred to the host 202 from the memory device 204 or transferred from the host 202 to the memory device 204. In some embodiments, the register access component 206 can facilitate transferring and fetching data that is to be operated upon by the control circuitry 220 and/or the register access component 206 can facilitate transferring and fetching data that is has been operated upon by the control circuitry 220, or in response to an action taken by the control circuitry 220, for transfer to the host 202.

The HSI 208 can provide an interface between the host 202 and the memory device 204 for commands and/or data traversing the channel 205. The HSI 208 can be a double data rate (DDR) interface such as a DDR3, DDR4, DDR5, etc. interface. Embodiments are not limited to a DDR interface, however, and the HSI 208 can be a quad data rate (QDR) interface, peripheral component interconnect (PCI) interface (e.g., a peripheral component interconnect express (PCIe)) interface, or other suitable interface for transferring commands and/or data between the host 202 and the memory device 204.

The controller 210 can be responsible for executing instructions from the host 202 and accessing the control circuitry 220 and/or the memory array 230. The controller 210 can be a state machine, a sequencer, or some other type of controller. The controller 210 can receive commands from the host 202 (via the HSI 208, for example) and, based on the received commands, control operation of the control circuitry 220 and/or the memory array 230. In some embodiments, the controller 210 can receive a command from the host 202 to cause performance of an operation using the control circuitry 220. Responsive to receipt of such a command, the controller 210 can instruct the control circuitry 220 to begin performance of the operation(s). As described herein, such operations can include recursive operations using bit strings and/or operations to modify results of iterations of the recursive operation by scaling the results of the iterations by a factor. In some embodiments, the operations can further include causing the modified results of the iterations to be stored in the quire register 231 and the factor by which the result of the iterations are scaled to be stored in the factor register 233.

In some embodiments, the controller 210 can be a global processing controller and may provide power management functions to the memory device 204. Power management functions can include control over power consumed by the memory device 204 and/or the memory array 230. For example, the controller 210 can control power provided to various banks of the memory array 230 to control which banks of the memory array 230 are operational at different times during operation of the memory device 204. This can include shutting certain banks of the memory array 230 down while providing power to other banks of the memory array 230 to optimize power consumption of the memory device 230. In some embodiments, the controller 210 controlling power consumption of the memory device 204 can include controlling power to various cores of the memory device 204 and/or to the control circuitry 220, the memory array 230, etc.

The main memory input/output (I/O) circuitry 214 can facilitate transfer of data and/or commands to and from the memory array 230. For example, the main memory I/O circuitry 214 can facilitate transfer of bit strings, data, and/or commands from the host 202 and/or the control circuitry 220 to and from the memory array 230. In some embodiments, the main memory I/O circuitry 214 can include one or more direct memory access (DMA) components that can transfer the bit strings (e.g., posit bit strings stored as blocks of data) from the control circuitry 220 to the memory array 230, and vice versa.

In some embodiments, the main memory I/O circuitry 214 can facilitate transfer of bit strings, data, and/or commands from the memory array 230 to the control circuitry 220 so that the control circuitry 220 can perform operations on the bit strings. Similarly, the main memory I/O circuitry 214 can facilitate transfer of bit strings that have had one or more operations performed on them by the control circuitry 220 to the memory array 230.

As described above, bit strings (e.g., the data) can be stored and/or retrieved from the memory array 230. In some embodiments, the main memory I/O circuitry 214 can facilitate storing and/or retrieval of the bit strings to and/or from the memory array 230. For example, the main memory I/O circuitry 214 can be enabled to transfer bit strings to the memory array 230 to be stored, and/or the main memory I/O circuitry 214 can facilitate retrieval of the bit strings (e.g., bit strings representing a performed operation between one or more bit string operands, modified results of iterations of operations performed between one or more bit string operands, etc.) from the memory array 230 in response to, for example, a command from the controller 210 and/or the control circuitry 220.

The row address strobe (RAS)/column address strobe (CAS) chain control circuitry 216 and the RAS/CAS chain component 218 can be used in conjunction with the memory array 230 to latch a row address and/or a column address to initiate a memory cycle. In some embodiments, the RAS/CAS chain control circuitry 216 and/or the RAS/CAS chain component 218 can resolve row and/or column addresses of the memory array 230 at which read and write operations associated with the memory array 230 are to be initiated or terminated. For example, upon completion of an operation using the control circuitry 220, the RAS/CAS chain control circuitry 216 and/or the RAS/CAS chain component 218 can latch and/or resolve a specific location in the memory array 230 to which the bit strings that have been operated upon by the control circuitry 220 are to be stored. Similarly, the RAS/CAS chain control circuitry 216 and/or the RAS/CAS chain component 218 can latch and/or resolve a specific location in the memory array 230 from which bit strings are to be transferred to the control circuitry 220 prior to, or subsequent to, the control circuitry 220 performing an operation (e.g., a recursive operation) using the bit string(s).

The control circuitry 220 can include a processing device (e.g., the processing device 122 illustrated in FIG. 1) and/or memory resource(s) (e.g., the memory resource 124 illustrated in FIG. 1). Bit strings (e.g., data, a plurality of bits, etc.) can be received by the control circuitry 220 from, for example, the host 202, the memory array 230, and/or an external memory device and stored by the control circuitry 220, for example in the memory resource of the control circuitry 220. The control circuitry (e.g., the processing device of the control circuitry 220) can perform recursive operations (or cause operations to be performed) using the bit string(s), modify the results of iterations of the recursive operations, and cause the modified intermediate results of the operations to be stored in the memory array 230.

In some embodiments, the control circuitry 220 can perform (or cause performance of) recursive arithmetic and/or logical operations using the bit strings. For example, the control circuitry 220 can be configured to perform (or cause performance of) recursive arithmetic operations such as recursive additions, recursive subtractions, recursive multiplications, recursive divisions, fused multiply addition operations, multiply-accumulate operations, recursive dot product operations, greater than or less than, absolute value (e.g., FABS( )), fast Fourier transforms, inverse fast Fourier transforms, sigmoid function operations, convolution operations, recursive square root operations, recursive exponent operations, and/or recursive logarithm operations, and/or recursive logical operations such as AND, OR, XOR, NOT, etc., as well as recursive trigonometric operations such as sine, cosine, tangent, etc. As will be appreciated, the foregoing list of operations is not intended to be exhaustive, nor is the foregoing list of operations intended to be limiting, and the control circuitry 220 may be configured to perform (or cause performance of) other arithmetic and/or logical operations using various bit strings.

In some embodiments, the control circuitry 220 may perform the above-listed operations in conjunction with execution of one or more machine learning algorithms. For example, the control circuitry 220 may perform operations related to one or more neural networks. Neural networks may allow for an algorithm to be trained over time to determine an output response based on input signals. For example, over time, a neural network may essentially learn to better maximize the chance of completing a particular goal. This may be advantageous in machine learning applications because the neural network may be trained over time with new data to achieve better maximization of the chance of completing the particular goal. A neural network may be trained over time to improve operation of particular tasks and/or particular goals. However, in some approaches, machine learning (e.g., neural network training) may be processing intensive (e.g., may consume large amounts of computer processing resources) and/or may be time intensive (e.g., may require lengthy calculations that consume multiple cycles to be performed).

By monitoring performance characteristics of machine learning applications and selectively converting between data types used by such applications, embodiments herein can allow for neural network training to be improved in comparison to approaches in which a fixed data type is used by the application and/or in which performance characteristics of the application are not monitored as part of determining an optimized data type for use by the application.

In some embodiments, the controller 210 can be configured to cause the control circuitry 220 (e.g., the processing device 122 and/or the APM component 123 illustrated in FIG. 1) to perform the operations described herein (e.g., perform operations to monitor applications to determine performance characteristics of the applications, operations to determine an optimized data type for a particular application, and/or operations to convert data used by the applications between different data types, etc.) without encumbering the host 202 (e.g., without receiving an intervening command or a command separate from a command to initiate performance of the operations from the host 202 and/or without transferring results of the operations to the host 202). Embodiments are not so limited, however, and in some embodiments, the controller 210 can be configured to cause the control circuitry 220 to perform the operations described herein based on commands generated by the controller in response to one or more commands asserted by the host 202.

Stated alternatively, in some embodiments, the host 202 can send a single command to the memory device 204, and hence, the control circuitry 220, to request performance of the operations describe herein. Responsive to receipt of the command to request performance of the operation(s), the memory device 204 (e.g., the controller 210, the control circuitry 220, or other components of the memory device 204) can perform the operation(s) in the absence of additional commands from the host 202. This can reduce traffic across the channels 203/205, which can increase performance of the computing device 200 associated with the host 202 and/or the memory device 204.

As described above in connection with FIG. 1, the memory array 230 can be a DRAM array, SRAM array, STT RAM array, PCRAM array, TRAM array, RRAM array, NAND flash array, and/or NOR flash array, for instance, although embodiments are not limited to these particular examples. The memory array 230 can function as main memory for the computing system 200 shown in FIGS. 2A and 2B. In some embodiments, the memory array 230 can be configured to store bit strings operated on by the control circuitry 220 (e.g., bit strings that represent a final result of a performed recursive operation) and/or store bit strings to be transferred to the control circuitry 220 prior to performance of operations using the bit strings.

Figure 2B:
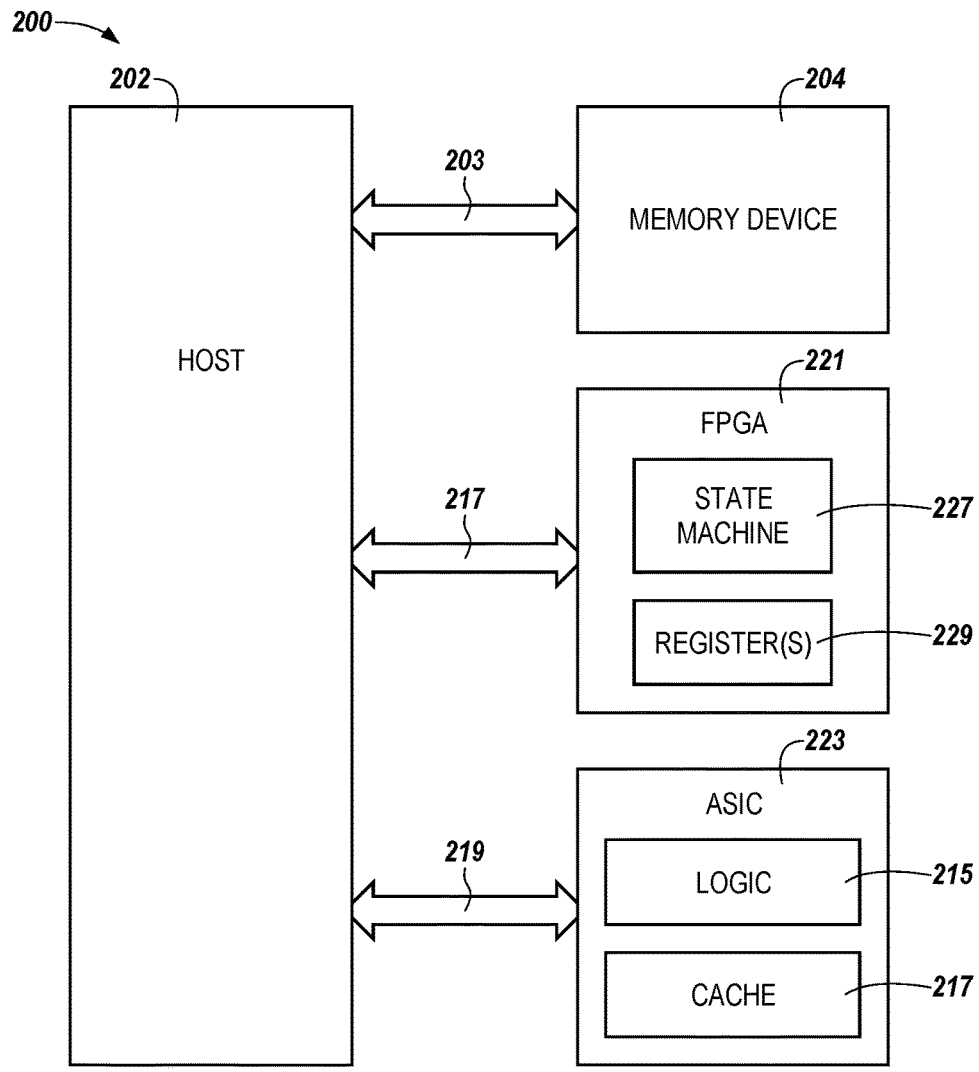
FIG. 2B is another functional block diagram in the form of a computing system including a host, a memory device, an application-specific integrated circuit, and a field programmable gate array in accordance with a number of embodiments of the present disclosure.

FIG. 2B is a functional block diagram in the form of a computing system 200 including a host 202, a memory device 204, an application-specific integrated circuit 223, and a field programmable gate array 221 in accordance with a number of embodiments of the present disclosure. Each of the components (e.g., the host 202, the memory device 204, the FPGA 221, the ASIC 223, etc.) can be separately referred to herein as an "apparatus."

As shown in FIG. 2B, the host 202 can be coupled to the memory device 204 via channel(s) 203, which can be analogous to the channel(s) 203 illustrated in FIG. 2A. The field programmable gate array (FPGA) 221 can be coupled to the host 202 via channel(s) 217 and the application-specific integrated circuit (ASIC) 223 can be coupled to the host 202 via channel(s) 219. In some embodiments, the channel(s) 217 and/or the channel(s) 219 can include a peripheral serial interconnect express (PCIe) interface, however, embodiments are not so limited, and the channel(s) 217 and/or the channel(s) 219 can include other types of interfaces, buses, communication channels, etc. to facilitate transfer of data between the host 202 and the FPGA 221 and/or the ASIC 223.

As described above, circuitry located on the memory device 204 (e.g., the control circuitry 220 illustrated in FIG. 2A) can perform operations to monitor applications to determine performance characteristics of the applications, operations to determine an optimized data type for a particular application, and/or operations to convert data used by the applications between different data types, etc. Embodiments are not so limited, however, and in some embodiments, the operations to monitor applications to determine performance characteristics of the applications, operations to determine an optimized data type for a particular application, and/or operations to convert data used by the applications between different data types, etc. can be performed by the FPGA 221 and/or the ASIC 223. In embodiments in which the FPGA 221 and/or the ASIC 223 are configured to perform the operations described herein, the FPGA and/or the ASIC 223 can be configured to perform and/or cause the performance of such operations.

As described above, non-limiting examples of recursive arithmetic and/or recursive logical operations that can be performed by the FPGA 221 and/or the ASIC 223 include arithmetic operations that can be performed as part of execution of an application. Examples of arithmetic operations and logical operations can include addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or logarithm operations, and/or logical operations such as AND, OR, XOR, NOT, etc., as well as trigonometric operations such as sine, cosine, tangent, etc. using the posit bit strings.

The FPGA 221 can include a state machine 227 and/or register(s) 229. The state machine 227 can include one or more processing devices that are configured to perform operations on an input and produce an output. For example, the FPGA 221 can be configured to perform the operations described above in connection with the processing device 122 and/or APM component 123 illustrated in FIG. 1.

The FPGA 221 can include register(s) 229 and/or buffers that can be configured to buffer and/or store the bit strings received form the host 202 prior to the state machine 227 performing the operations described above in connection with the processing device 122 and/or APM component 123 illustrated in FIG. 1.

The ASIC 223 can include logic 215 and/or a cache 217. The logic 215 can include circuitry configured to perform operations on an input and produce an output. In some embodiments, the ASIC 223 is configured to perform the operations described above in connection with the processing device 122 and/or APM component 123 illustrated in FIG. 1.

The ASIC 223 can include a cache 217 that can be configured to buffer and/or store the bit strings received from the host 202 prior to the logic 229 performing an operation on the received bit strings. In addition, the cache of the ASIC 223 can be configured to buffer data corresponding to the operations described above in connection with the processing device 122 and/or APM component 123 illustrated in FIG. 1.

Figure 3:
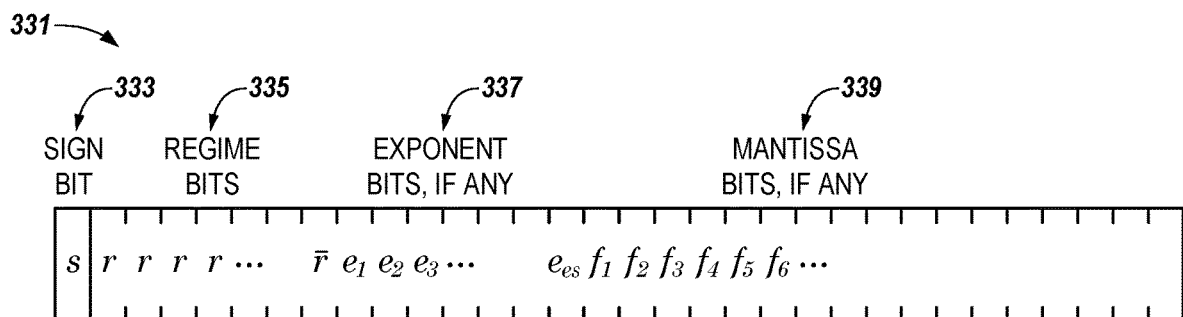
FIG. 3 is an example of an n-bit post with es exponent bits.

FIG. 3 is an example of an n-bit universal number, or "unum" with es exponent bits. In the example of FIG. 3, the n-bit unum is a posit bit string 331. As shown in FIG. 3, the n-bit posit 331 can include a set of sign bit(s) (e.g., a first bit sub-set or a sign bit sub-set 333), a set of regime bits (e.g., a second bit sub-set or the regime bit sub-set 335), a set of exponent bits (e.g., a third bit sub-set or an exponent bit sub-set 337), and a set of mantissa bits (e.g., a fourth bit sub-set or a mantissa bit sub-set 339). The mantissa bits 339 can be referred to in the alternative as a "fraction portion" or as "fraction bits," and can represent a portion of a bit string (e.g., a number) that follows a decimal point.

The sign bit 333 can be zero (0) for positive numbers and one (1) for negative numbers. The regime bits 335 are described in connection with Table 1, below, which shows (binary) bit strings and their related numerical meaning, k. In Table 1, the numerical meaning, k, is determined by the run length of the bit string. The letter x in the binary portion of Table 1 indicates that the bit value is irrelevant for determination of the regime, because the (binary) bit string is terminated in response to successive bit flips or when the end of the bit string is reached. For example, in the (binary) bit string 0010, the bit string terminates in response to a zero flipping to a one and then back to a zero. Accordingly, the last zero is irrelevant with respect to the regime and all that is considered for the regime are the leading identical bits and the first opposite bit that terminates the bit string (if the bit string includes such bits).

TABLE 1

| Binary | 0000 | 0001 | 001X | 01XX | 10XX | 110X | 1110 | 1111 |
|---|---|---|---|---|---|---|---|---|
| Numerical (k) | −4 | −3 | −2 | −1 | 0 | 1 | 2 | 3 |

In FIG. 3, the regime bits 335 r correspond to identical bits in the bit string, while the regime bits 335 r̄ correspond to an opposite bit that terminates the bit string. For example, for the numerical k value −2 shown in Table 1, the regime bits r correspond to the first two leading zeros, while the regime bit(s) r̄ correspond to the one. As noted above, the final bit corresponding to the numerical k, which is represented by the X in Table 1 is irrelevant to the regime.

If m corresponds to the number of identical bits in the bit string, if the bits are zero, k=−m. If the bits are one, then k=m−1. This is illustrated in Table 1 where, for example, the (binary) bit string 10XX has a single one and k=m−1=1−1=0. Similarly, the (binary) bit string 0001 includes three zeros so k=−m=−3. The regime can indicate a scale factor of useed$^k$, where useed=$2^{2^{es}}$. Several example values for used are shown below in Table 2.

TABLE 2

| es | 0 | 1 | 2 | 3 | 4 |
|---|---|---|---|---|---|
| used | 2 | $2^2 = 4$ | $4^2 = 16$ | $16^2 = 256$ | $256^2 = 65536$ |

The exponent bits 337 correspond to an exponent e, as an unsigned number. In contrast to floating-point numbers, the exponent bits 337 described herein may not have a bias associated therewith. As a result, the exponent bits 337 described herein may represent a scaling by a factor of $2^e$. As shown in FIG. 3, there can be up to es exponent bits ($e_1$, $e_2$, $e_3$, ... $e_{es}$), depending on how many bits remain to right of the regime bits 335 of the n-bit posit 331. In some embodiments, this can allow for tapered accuracy of the n-bit posit 331 in which numbers which are nearer in magnitude to one have a higher accuracy than numbers which are very large or very small. However, as very large or very small numbers may be utilized less frequent in certain kinds of operations, the tapered accuracy behavior of the n-bit posit 331 shown in FIG. 3 may be desirable in a wide range of situations.

The mantissa bits 339 (or fraction bits) represent any additional bits that may be part of the n-bit posit 331 that lie to the right of the exponent bits 337. Similar to floating-point bit strings, the mantissa bits 339 represent a fraction f, which can be analogous to the fraction 1·f where f includes one or more bits to the right of the decimal point following the one. In contrast to floating-point bit strings, however, in the n-bit posit 331 shown in FIG. 3, the "hidden bit" (e.g., the one) may always be one (e.g., unity), whereas floating-point bit strings may include a subnormal number with a "hidden bit" of zero (e.g., 0·f).

As described herein, alter a numerical value or a quantity of bits of one of more of the sign 333 bit sub-set, the regime 335 bit sub-set, the exponent 337 bit sub-set, or the mantissa 339 bit sub-set can vary the precision of the n-bit posit 331. For example, changing the total number of bits in the n-bit posit 331 can alter the resolution of the n-bit posit bit string 331. That is, an 8-bit posit can be converted to a 16-bit posit by, for example, increasing the numerical values and/or the quantity of bits associated with one or more of the posit bit string's constituent bit sub-sets to increase the resolution of the posit bit string. Conversely, the resolution of a posit bit string can be decreased for example, from a 64-bit resolution to a 32-bit resolution by decreasing the numerical values and/or the quantity of bits associated with one or more of the posit bit string's constituent bit sub-sets.

In some embodiments, altering the numerical value and/or the quantity of bits associated with one or more of the regime 335 bit sub-set, the exponent 337 bit sub-set, and/or the mantissa 339 bit sub-set to vary the precision of the n-bit posit 331 can lead to an alteration to at least one of the other of the regime 335 bit sub-set, the exponent 337 bit sub-set, and/or the mantissa 339 bit sub-set. For example, when altering the precision of the n-bit posit 331 to increase the resolution of the n-bit posit bit string 331 (e.g., when performing an "up-convert" operation to increase the bit width of the n-bit posit bit string 331), the numerical value and/or the quantity of bits associated with one or more of the regime 335 bit sub-set, the exponent 337 bit sub-set, and/or the mantissa 339 bit sub-set may be altered.

In a non-limiting example in which the resolution of the n-bit posit bit string 331 is increased (e.g., the precision of the n-bit posit bit string 331 is varied to increase the bit width of the n-bit posit bit string 331) but the numerical value or the quantity of bits associated with the exponent 337 bit sub-set does not change, the numerical value or the quantity of bits associated with the mantissa 339 bit sub-set may be increased. In at least one embodiment, increasing the numerical value and/or the quantity of bits of the mantissa 339 bit sub-set when the exponent 338 bit sub-set remains unchanged can include adding one or more zero bits to the mantissa 339 bit sub-set.

In another non-limiting example in which the resolution of the n-bit posit bit string 331 is increased (e.g., the precision of the n-bit posit bit string 331 is varied to increase the bit width of the n-bit posit bit string 331) by altering the numerical value and/or the quantity of bits associated with the exponent 337 bit sub-set, the numerical value and/or the quantity of bits associated with the regime 335 bit sub-set and/or the mantissa 339 bit sub-set may be either increased or decreased. For example, if the numerical value and/or the quantity of bits associated with the exponent 337 bit sub-set is increased or decreased, corresponding alterations may be made to the numerical value and/or the quantity of bits associated with the regime 335 bit sub-set and/or the mantissa 339 bit sub-set. In at least one embodiment, increasing or decreasing the numerical value and/or the quantity of bits associated with the regime 335 bit sub-set and/or the mantissa 339 bit sub-set can include adding one or more zero bits to the regime 335 bit sub-set and/or the mantissa 339 bit sub-set and/or truncating the numerical value or the quantity of bits associated with the regime 335 bit sub-set and/or the mantissa 339 bit sub-set.

In another example in which the resolution of the n-bit posit bit string 331 is increased (e.g., the precision of the n-bit posit bit string 331 is varied to increase the bit width of the n-bit posit bit string 331), the numerical value and/or the quantity of bits associated with the exponent 335 bit sub-set may be increased and the numerical value and/or the quantity of bits associated with the regime 333 bit sub-set may be decreased. Conversely, in some embodiments, the numerical value and/or the quantity of bits associated with the exponent 335 bit sub-set may be decreased and the numerical value and/or the quantity of bits associated with the regime 333 bit sub-set may be increased.

In a non-limiting example in which the resolution of the n-bit posit bit string 331 is decreased (e.g., the precision of the n-bit posit bit string 331 is varied to decrease the bit width of the n-bit posit bit string 331) but the numerical value or the quantity of bits associated with the exponent 337 bit sub-set does not change, the numerical value or the quantity of bits associated with the mantissa 339 bit sub-set may be decreased. In at least one embodiment, decreasing the numerical value and/or the quantity of bits of the mantissa 339 bit sub-set when the exponent 338 bit sub-set remains unchanged can include truncating the numerical value and/or the quantity of bits associated with the mantissa 339 bit sub-set.

In another non-limiting example in which the resolution of the n-bit posit bit string 331 is decreased (e.g., the precision of the n-bit posit bit string 331 is varied to decrease the bit width of the n-bit posit bit string 331) by altering the numerical value and/or the quantity of bits associated with the exponent 337 bit sub-set, the numerical value and/or the quantity of bits associated with the regime 335 bit sub-set and/or the mantissa 339 bit sub-set may be either increased or decreased. For example, if the numerical value and/or the quantity of bits associated with the exponent 337 bit sub-set is increased or decreased, corresponding alterations may be made to the numerical value and/or the quantity of bits associated with the regime 335 bit sub-set and/or the mantissa 339 bit sub-set. In at least one embodiment, increasing or decreasing the numerical value and/or the quantity of bits associated with the regime 335 bit sub-set and/or the mantissa 339 bit sub-set can include adding one or more zero bits to the regime 335 bit sub-set and/or the mantissa 339 bit sub-set and/or truncating the numerical value or the quantity of bits associated with the regime 335 bit sub-set and/or the mantissa 339 bit sub-set.

In some embodiments, changing the numerical value and/or a quantity of bits in the exponent bit sub-set can alter the dynamic range of the n-bit posit 331. For example, a 32-bit posit bit string with an exponent bit sub-set having a numerical value of zero (e.g., a 32-bit posit bit string with es=0, or a (32,0) posit bit string) can have a dynamic range of approximately 18 decades. However, a 32-bit posit bit string with an exponent bit sub-set having a numerical value of 3 (e.g., a 32-bit posit bit string with es=3, or a (32,3) posit bit string) can have a dynamic range of approximately 145 decades.

Figure 4A:
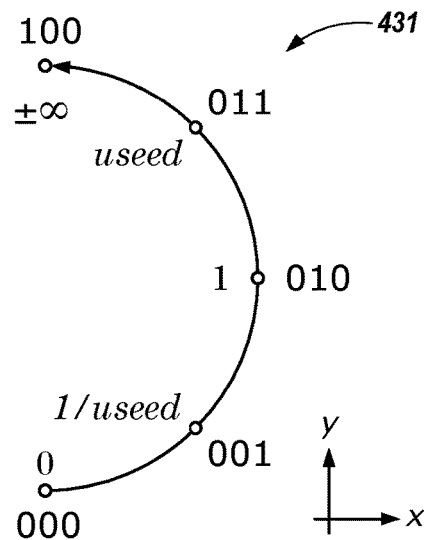
FIG. 4A is an example of positive values for a 3-bit posit.

FIG. 4A is an example of positive values for a 3-bit posit. In FIG. 4A, only the right half of projective real numbers, however, it will be appreciated that negative projective real numbers that correspond to their positive counterparts shown in FIG. 4A can exist on a curve representing a transformation about the y-axis of the curves shown in FIG. 4A.

Figure 4B:
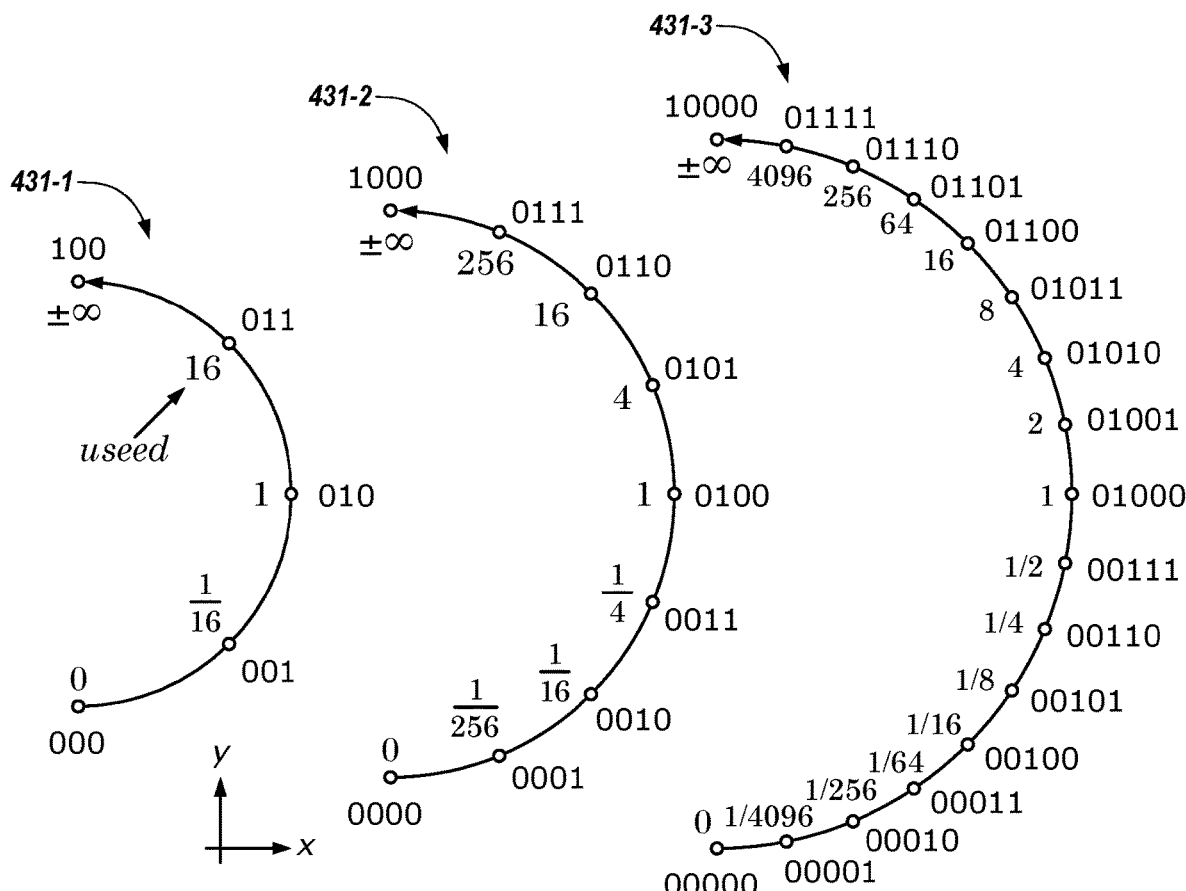
FIG. 4B is an example of posit construction using two exponent bits.

In the example of FIG. 4A, es=2, so useed=$2^{2^{es}}$=16. The precision of a posit 431-1 can be increased by appending bits the bit string, as shown in FIG. 4B. For example, appending a bit with a value of one (1) to bit strings of the posit 431-1 increases the accuracy of the posit 431-1 as shown by the posit 431-2 in FIG. 4B. Similarly, appending a bit with a value of one to bit strings of the posit 431-2 in FIG. 4B increases the accuracy of the posit 431-2 as shown by the posit 431-3 shown in FIG. 4B. An example of interpolation rules that may be used to append bits to the bits strings of the posits 431-1 shown in FIG. 4A to obtain the posits 431-2, 431-3 illustrated in FIG. 4B follow.

If maxpos is the largest positive value of a bit string of the posits 431-1, 431-2, 431-3 and minpos is the smallest value of a bit string of the posits 431-1, 431-2, 431-3, maxpos may be equivalent to useed and minpos may be equivalent to $$\frac{1}{useed}.$$

Between maxpos and ∞, a new bit value may be maxpos*useed, and between zero and minpos, a new bit value may be $$\frac{minpos}{useed}.$$

These new bit values can correspond to a new regime bit 335. Between existing values x=$2^m$ and y=$2^n$, where m and n differ by more than one, the new bit value may be given by the geometric mean:

$$\sqrt{x \times y} = 2^{\frac{(m+n)}{2}},$$

which corresponds to a new exponent bit 337. If the new bit value is midway between the existing x and y values next to it, the new bit value can represent the arithmetic mean $$\frac{x+y}{2},$$

which corresponds to a new mantissa bit 339.

FIG. 4B is an example of posit construction using two exponent bits. In FIG. 4B, only the right half of projective real numbers, however, it will be appreciated that negative projective real numbers that correspond to their positive counterparts shown in FIG. 4B can exist on a curve representing a transformation about the y-axis of the curves shown in FIG. 4B. The posits 431-1, 431-2, 431-3 shown in FIG. 4B each include only two exception values: Zero (0) when all the bits of the bit string are zero and ±∞ when the bit string is a one (1) followed by all zeros. It is noted that the numerical values of the posits 431-1, 431-2, 431-3 shown in FIG. 4 are exactly useed$^k$. That is, the numerical values of the posits 431-1, 431-2, 431-3 shown in FIG. 4 are exactly useed to the power of the k value represented by the regime (e.g., the regime bits 335 described above in connection with FIG. 3). In FIG. 4B, the posit 431-1 has es=2, so useed=$2^{2^{es}}$=16, the posit 431-2 has es=3, so useed=$2^{2^{es}}$=256, and the posit 431-3 has es=4, so useed=$2^{2^{es}}$=4096.

As an illustrative example of adding bits to the 3-bit posit 431-1 to create the 4-bit posit 431-2 of FIG. 4B, the useed=256, so the bit string corresponding to the useed of 256 has an additional regime bit appended thereto and the former useed, 16, has a terminating regime bit (r̄) appended thereto. As described above, between existing values, the corresponding bit strings have an additional exponent bit appended thereto. For example, the numerical values 1/16, 1/4, 1, and 4 will have an exponent bit appended thereto. That is, the final one corresponding to the numerical value 4 is an exponent bit, the final zero corresponding to the numerical value 1 is an exponent bit, etc. This pattern can be further seen in the posit 431-3, which is a 5-bit posit generated according to the rules above from the 4-bit posit 431-2. If another bit was added to the posit 431-3 in FIG. 4B to generate a 6-bit posit, mantissa bits 339 would be appended to the numerical values between 1/16 and 16.

A non-limiting example of decoding a posit (e.g., a posit 431) to obtain its numerical equivalent follows. In some embodiments, the bit string corresponding to a posit p is an unsigned integer ranging from $-2^{n-1}$ to $2^{n-1}$, k is an integer corresponding to the regime bits 335 and e is an unsigned integer corresponding to the exponent bits 337. If the set of mantissa bits 339 is represented as $\{f_1 f_2 \ldots f_{fs}\}$ and f is a value represented by 1. $f_1 f_2 \ldots f_{fs}$ (e.g., by a one followed by a decimal point followed by the mantissa bits 339), the p can be given by Equation 1, below.

$$x = \begin{cases} 0, & p = 0 \\ \pm\infty, & p = -2^{n-1} \\ \text{sign}(p) \times useed^k \times 2^e \times f, & \text{all other } p \end{cases} \quad \text{Equation 1}$$

A further illustrative example of decoding a posit bit string is provided below in connection with the posit bit string 0000110111011101 shown in Table 3, below follows.

TABLE 3

| SIGN | REGIME | EXPONENT | MANTISSA |
|---|---|---|---|
| 0 | 0001 | 101 | 11011101 |

In Table 3, the posit bit string 0000110111011101 is broken up into its constituent sets of bits (e.g., the sign bit 333, the regime bits 335, the exponent bits 337, and the mantissa bits 339). Since es=3 in the posit bit string shown in Table 3 (e.g., because there are three exponent bits), useed=256. Because the sign bit 333 is zero, the value of the numerical expression corresponding to the posit bit string shown in Table 3 is positive. The regime bits 335 have a run of three consecutive zeros corresponding to a value of −3 (as described above in connection with Table 1). As a result, the scale factor contributed by the regime bits 335 is $256^{-3}$ (e.g., useed$^k$). The exponent bits 337 represent five (5) as an unsigned integer and therefore contribute an additional scale factor of $2^e = 2^5 = 32$. Lastly, the mantissa bits 339, which are given in Table 3 as 11011101, represent two-hundred and twenty-one (221) as an unsigned integer, so the mantissa bits 339, given above as f are $$f + \frac{221}{256}.$$

Using these values and Equation 1, the numerical value corresponding to the posit bit string given in Table 3 is $$+256^{-3} \times 2^5 \times \left(1 + \frac{221}{256}\right) = \frac{437}{134217728} \approx 3.55393 \times 10^{-6}.$$

Figure 5:
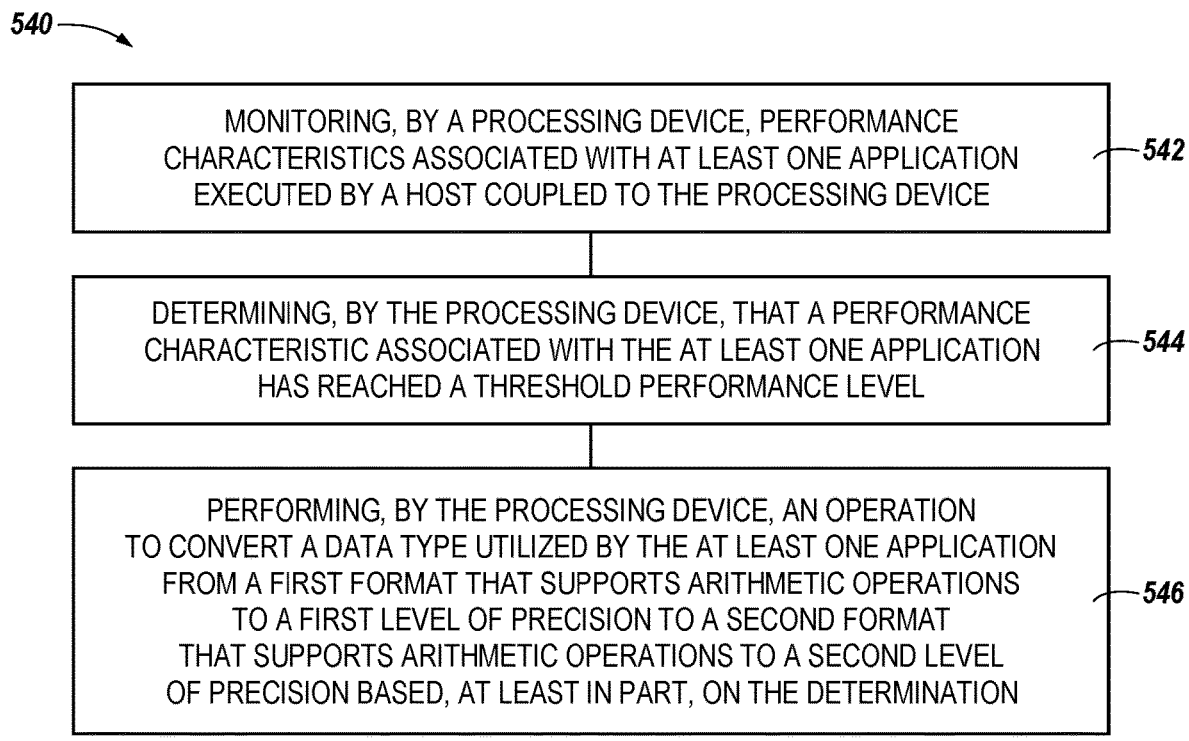
FIG. 5 is a flow diagram representing an example method for application-based data type selection in accordance with a number of embodiments of the present disclosure.

FIG. 5 is a flow diagram representing an example method 540 for application-based data type selection in accordance with a number of embodiments of the present disclosure. At block 542, the method 540 can include monitoring, by a processing device, performance characteristics associated with at least one application executed by a host coupled to the processing device. The application can be an application configured to perform a personalized medicine computation, an automotive computation, or a cyber-security computation, or any combination thereof. Embodiments are not so limited, however, and the application can be one or more of any types of applications described herein, as well as other computing applications that are configured to perform specific tasks and/or functions when executed by a computing system. The processing device can be analogous to the processing device 122 illustrated in FIG. 1, herein.

As described above, the performance characteristics can include application errors generated due to iteration, power consumption associated with the at least one application, precision or accuracy of data generated when the at least one application is executed using data in the first format or data on the second format, a latency parameter associated with the at least one application, or a reliability parameter associated with the at least one application, or any combination thereof. Embodiments are not so limited, however, and in some embodiments, the performance characteristics can include a health of the at least one application while the at least one application performs operations using data formatted according to the first format, a health of the at least one application while the at least one application performs operations using data formatted according to the second format, or both.

At block 544, the method 540 can include determining, by the processing device, that a performance characteristic associated with the at least one application has reached a threshold performance level.

At block 546, the method 540 can include performing, by the processing device, an operation to convert a data type utilized by the at least one application from a first format that supports arithmetic operations to a first level of precision to a second format that supports arithmetic operations to a second level of precision based, at least in part, on the determination. In some embodiments, one of the first format and the second format can be an IEEE 754 format or a fixed-point binary format and the other of the first format and the second format can be a universal number or posit format. Further, in some embodiments, the operation to convert the data type utilized by the at least one application from the first format to the second format can include altering a quantity of bits associated with at least one bit sub-set contained within the data type.

The method 540 can further include determining, by the processing device, that the at least one performance characteristic associated with the at least one application has reached a second threshold performance level and performing, by the processing device, an operation to convert the data type utilized by the at least one application from the second format to a third format based, at least in part, on the determination.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    monitoring, by a processing device, performance characteristics associated with at least one application executed by the processing device or a host coupled to the processing device;
    analyzing the performance characteristics to determine that a change in at least one performance characteristic has occurred with respect to at least one application;
    determining, by the processing device, that the at least one performance characteristic associated with the at least one application has reached a threshold performance level based on the analyzed performance characteristics;
    determining that the at least one application is a financial application;
    altering a quantity of bits associated with a mantissa bit sub-set of data used by the at least one application based on the determination that the at least one application is the financial application;
    determining, by the processing device, a probability that the at least one application operates without failure for a set duration of time; and
    performing, by the processing device, an operation to convert a data type utilized by the at least one application from an IEEE 754 format or a fixed-point binary format to a posit format based, at least in part, on the determination that the performance characteristic associated with the at least one application has reached the threshold performance level and a determination that the probability that the at least one application operates without failure for the set duration of time meets a threshold duration of time.

2. The method of claim 1, wherein the posit format comprises a sign, a regime, an exponent, and a mantissa.

3. The method of claim 1, wherein the performance characteristics include application errors generated due to iteration, power consumption associated with the at least one application, precision or accuracy of data generated when the at least one application is executed using data in the first format or data in the second format, or a reliability parameter associated with the at least one application, or any combination thereof.

4. The method of claim 1, wherein the performance characteristics include a health of the at least one application while the at least one application performs operations using data formatted according to the first format, a health of the at least one application while the at least one application performs operations using data formatted according to the second format, or both.

5. The method of claim 1, further comprising:
    determining, by the processing device, that the at least one performance characteristic associated with the at least one application has reached a second threshold performance level; and
    performing, by the processing device, an operation to convert the data type utilized by the at least one application from the second format to a third format based, at least in part, on the determination.

6. The method of claim 1, wherein the at least one application comprises an application configured to perform a personalized medicine computation, an automotive computation, or a cyber-security computation, or any combination thereof.

7. The method of claim 1, wherein performing the operation to convert the data type utilized by the at least one application from the first format to the second format comprises altering a quantity of bits associated with at least one bit sub-set contained within the data type.

8. An apparatus, comprising:
    a processing device and a memory resource configured as a cache for the processing device, wherein the processing device and the memory resource are resident on a memory device, and wherein the processing device is configured to:
    monitor performance characteristics associated with execution of applications executed by the processing device or a host coupled to the processing device;
    analyze the performance characteristics to determine that a change in at least one performance characteristic has occurred with respect to at least one application;
    determine that the at least one performance characteristic associated with the at least one application that uses data formatted according to a first format that supports arithmetic operations to a first level of precision has reached a threshold performance level;
    determine that the at least one application is an astronomical application;
    alter a quantity of bits associated with at least one bit sub-set of the data used by the at least one application based on the determination that the at least one application is the astronomical application to increase a dynamic range available to the at least one application;
    determine a probability that the at least one application operates without failure for a set duration of time;

perform an operation to convert the data utilized by the at least one application from the first format to a second format that supports arithmetic operations to a second level of precision based, at least in part, on the determination that the performance characteristic has reached the threshold performance level and a determination that the probability that the at least one application operates without failure for the set duration of time meets a threshold duration of time; and cause the at least one application to be executed using the data formatted according to the second format.

9. The apparatus of claim 8, wherein the applications include applications configured to perform astronomical computations, atomic computations, or financial computations, or any combination thereof.

10. The apparatus of claim 8, wherein the performance characteristics include a quantity of application errors, a collected user satisfaction metric, types of application dependencies, or a transaction trace associated with the at least one application, or any combination thereof.

11. The apparatus of claim 8, wherein the processing device is further configured to perform the operation to convert the data utilized by the at least one application from the first format to the second format by altering a quantity of bits associated with at least one bit sub-set contained within the data.

12. The apparatus of claim 8, wherein the processing device is further configured to:
determine that the performance characteristic associated with the at least one application has reached a second threshold performance level; and
perform an operation to convert the data utilized by the at least one application from the second format to a third format based, at least in part, on the determination.

13. The apparatus of claim 8, wherein the processing device is further configured to:
determine an application type for the at least one application; and
alter a precision of the data in the second format based, at least in part, on the determined application type of the at least one application.

14. The apparatus of claim 8, further comprising an application performance management component coupled to the processing device, wherein the processing device is further configured to access data generated by the application performance management component to monitor the performance characteristics.

15. An apparatus, comprising:
a processing device and a memory resource configured as a cache for the processing device, wherein the processing device and the memory resource are resident on a memory device, and wherein the processing device is configured to:
monitor characteristics of a plurality of applications executed by the processing device;
determine that an application type for a particular application based on the monitored characteristics for the particular application is an atomic application;
determine a type of data utilized by the particular application, wherein the type of data comprises data formatted in a first format that supports arithmetic operations to a first level of precision or data formatted in a second format that supports arithmetic operations to a second level of precision;
alter a quantity of bits associated with at least one bit sub-set of the data used by the particular application based on a determination that the particular application is the atomic application to increase a dynamic range available to the at least one application;
determine that one of the first format or the second format corresponds to performance characteristics of the particular application being greater than a threshold application performance characteristic;
determine a probability that the particular application operates without failure for a set duration of time;
perform an operation to convert the data from the first format or the second format to the other of the first format or the second format based on the determination that the performance characteristics of the particular application are greater than the threshold application performance characteristic using the other of the first format or the second format and a determination that the probability that the particular application operates without failure for the set duration of time meets a threshold duration of time; and
execute the particular application using data formatted in the converted format.

16. The apparatus of claim 15, wherein the processing device is configured to:
determine that the application type for the application corresponds to an astronomical computation application;
determine that the first format comprises an IEEE 754 or fixed-point binary format and the second format comprises a universal number format or a posit format; and
perform the operation to convert a data from the first format to a second format.

17. The apparatus of claim 15, wherein the processing device is configured to:
determine that the application type for the application corresponds to an atomic computation application;
determine that the first format comprises an IEEE 754 or fixed-point binary format and the second format comprises a universal number format or a posit format; and
perform the operation to convert the data from the first format to the second format.

18. The apparatus of claim 15, wherein the performance characteristics include monitored application response times, application error information, collected user satisfaction metrics, application dependencies among the plurality of applications, or a transaction trace associated with the particular application, or any combination thereof.

19. A system, comprising:
a host;
a processing device coupled to the host; and
a component configured to generate performance characteristics, the component coupled to the processing device, wherein the processing device is configured to:
receive the performance characteristics generated by the component and corresponding to execution of applications executed by the host;
analyze the performance characteristics to determine that a change in at least one performance characteristic has occurred with respect to at least one application;
determine that the at least one application is a financial application;
alter a quantity of bits associated with a mantissa bit sub-set of data used by the at least one application based on the determination that the at least one application is the financial application;
determine a probability that the at least one application operates without failure for a set duration of time;

perform an operation to convert data utilized by the at least one application from an IEEE 754 format or a fixed-point binary format to a posit format based, at least in part, on the determination that the change in the at least one performance characteristic has occurred with respect to at least one application and a determination that the probability that the at least one application operates without failure for a set duration of time; and execute the at least one application using the data formatted according to the second format.

20. The system of claim 19, wherein the processing device is further configured to:

determine that the performance characteristic associated with the at least one application has reached a second threshold performance level;

perform an operation to convert the data utilized by the at least one application from the second format to the first format based, at least in part, on the determination; and execute the at least one application using the data formatted according to the first format.

21. The system of claim 19, wherein the performance characteristics include information corresponding to a health of the applications executed by the host.

22. The system of claim 19, wherein the processing device is further configured to:

determine that the at least one application is an astronomical application; and alter a quantity of bits associated with at least one bit sub-set of the data used by the at least one application based on the determination to increase a dynamic range available to the at least one application.

23. The system of claim 19, wherein the processing device is further configured to:

determine that the at least one application is an atomic application; and alter a quantity of bits associated with at least one bit sub-set of the data used by the at least one application based on the determination to increase a dynamic range available to the at least one application.

\* \* \* \* \*